Nov. 7, 1967 W. C. SEELBACH ET AL 3,351,778

TRAILING EDGE J-K FLIP-FLOP

Filed Oct. 8, 1964 2 Sheets-Sheet 1

INVENTORS
Walter C. Seelbach
Arthur M. Cappon
Paul J. DeMarco
Norman J. Miller

Mueller & Aichele

ATT'YS.

INVENTORS
Walter C. Seelbach
Arthur M. Cappon
Paul J. DeMarco
Norman J. Miller

Mueller & Aichele
ATT'YS.

United States Patent Office 3,351,778
Patented Nov. 7, 1967

3,351,778

TRAILING EDGE J-K FLIP-FLOP

Walter C. Seelbach, Scottsdale, Arthur M. Cappon, Phoenix, Paul J. De Marco, Mesa, and Norman J. Miller, Scottsdale, Ariz., assignors to Motorola, Inc., Chicago, Ill., a corporation of Illinois Filed Oct. 8, 1964, Ser. No. 402,388
9 Claims. (Cl. 307—88.5)

ABSTRACT OF THE DISCLOSURE

A J-K flip-flop having first and second output transistors cross-coupled to first and second holding transistors, respectively and first and second pullover transistors conected in parallel with the first and second holding transistors, respectively. First and second input logic circuits AC coupled through first and second capacitors to the first and second pullover transistors, respectively, to thereby toggle the flip-flop, and first and second clamping transistors connected, respectively between the first and second output transistors and the first and second pullover transistors to insure proper J-K operation.

The present invention relates to bi-stable multivibrators of the type commonly referred to as flip-flop; and it relates more particularly to an improved and simplified trailing edge triggered flip-flop of the "J-K" type, and one which is particularly adapted to emitter coupled logic integrated circuit construction.

The flip-flop has two stable states, commonly referred to as the set and the reset state. There are several types of flip-flops generally known to the art. These types include the set-reset flip-flop and the J-K flip-flop. The usual set-reset flip-flop can be triggered to its set state by a signal applied to its set input terminal, and it can then be returned to its reset state by a signal applied to its reset input terminal. In terms of logic operations, a signal which can cause the flip-flop to change its state is a logical "one," and the absence of the signal is a logical "zero." There are four possible combinations of inputs to a set-reset flip-flop. In the two cases described above, i.e., setting and resetting, there is a logical "one" at one input and a logical "zero" at the other input. The set input receives the logical "one" when the flip-flop is changed to its set state, and the reset input receives the logical "one" when the flip-flop is changed to its reset condition. In a third case, both inputs receive a logical "zero" so the flip-flop does not change its state. The fourth possibility is that in which both inputs receive a logical "one" simultaneously. The set-reset flip-flop might change its state in this case because practical circuits are not perfectly balanced, but one cannot predict in advance which state will result. The state is indeterminate.

The state of a J-K flip-flop, on the other hand, is predetermined for all four possible combinations of inputs. It can be set by a logical "one" at its set input and a logical "zero" at its reset input, and it will reset when there is a logical "one" at its reset input and a logical "zero" at its set input. It will not change its state with a logical "zero" at both inputs, and it will always change state with a logical "one" at both inputs. The latter condition is referred to as toggling, and a J-K flip-flop is said to have toggle capabilities.

Although J-K flip-flop circuits are known in the art, they have said several drawbacks, particularly when it is desired to fabricate the flip-flop in the form of an integrated circuit. Some known circuits are too complex, others do not operate fast enough, and others simply cannot be fabricated satisfactorily as integrated circuits.

It is an object of this invention to provide an improved J-K flip-flop which overcomes the disadvantages just referred to.

Another object of the invention is to provide such an improved circuit which exhibits high speed capabilities for use in high speed digital logic circuits.

Yet another object of the invention is to provide such an improved circuit which is particularly adapted to emitter coupled integrated circuit construction.

A feature of the invention is the provision of a J-K flip-flop which may be triggered by extremely low signal voltage, while at the same time maintaining relatively high input impedance and low input capacitance.

A considerable amount of development work has been carried out in recent years on integrated circuits. Such circuits include a plurality of p-n junctions formed in a semiconductor substrate. The substrate may be of silicon, and the junctions, as is well-known, are constructed to provide diodes and transistors in the substrate.

The usual prior art integrated circuit flip-flop is relatively complex in the circuitry involved therein. The usual complexity of the circuitry of the prior art flip-flops of this type arises from efforts to avoid signal racing. Signal racing often results in the simultaneous triggering of two or more flip-flops in a chain, where successive triggering is required. In such prior art circuits, separate phase displaced clock signals are often used in conjunction with relatively complex circuitry in order to avoid signal racing.

The transistorized flip-flop described in this application utilizes a trailing edge triggering concept in order to avoid signal racing. This concept obviates the need for a multiplicity of phase-displaced triggering signals and for the relatively complex circuitry required in conjunction therewith.

The use of trailing edge triggering assures that any particular flip-flop in a chain is triggered only by the trailing edge of the input signal. Then, the next flip-flop in the chain is conditioned for triggering only after the termination of the particular state of the input signal which triggered the previous flip-flop. There is, therefore, no tendency for the occurrence of erroneous concurrent triggering of more than one flip-flop in the chain.

Although the trailing edge triggered flip-flops are less complex than the usual flip-flop using phase-displaced triggering signals, the trailing edge triggered flip-flops of the prior art are still relatively complicated. The improved circuit of the present invention vastly simplifies the trailing edge triggered J-K flip-flop.

Figure 1:
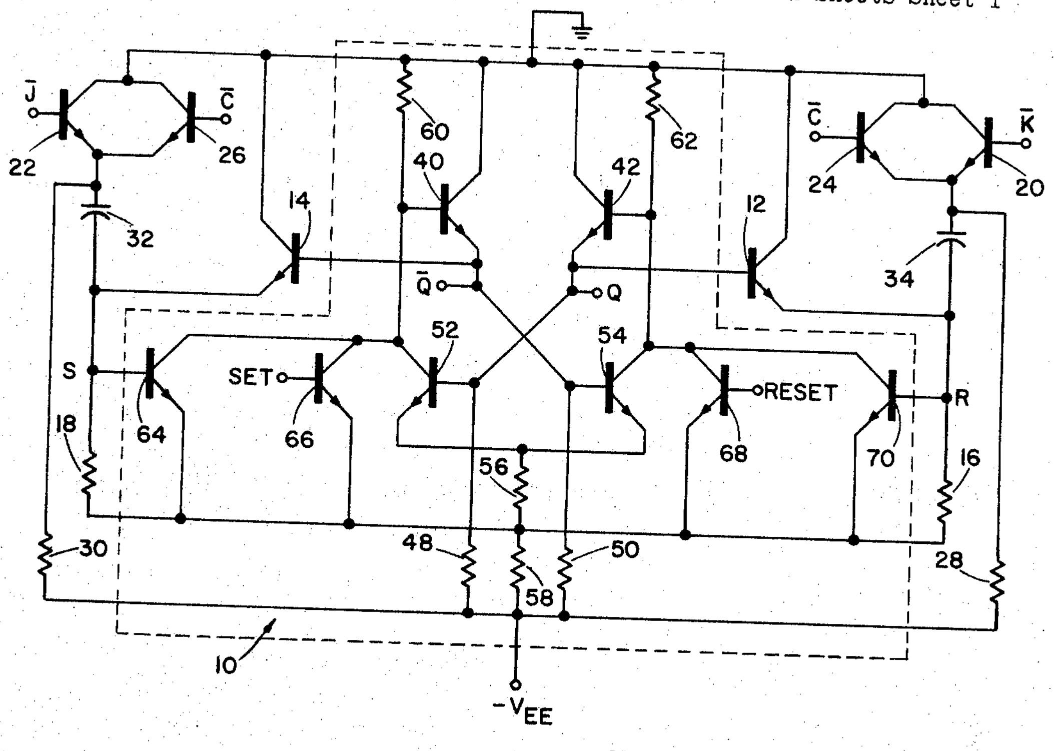
FIG. 1 is a circuit diagram of a J-K flip-flop in accordance with one embodiment of the invention.

The system of FIG. 1 includes a set-reset flip-flop 10 represented by the dashed-line block. This flip-flop may be of the type disclosed and claimed, for example, in copending application Ser. No. 363,959, filed on Apr. 30, 1964, and assigned to the present assignee.

The set-reset flip-flop 10 includes the usual output terminals Q and $\overline{Q}$. In the circuit of FIG. 1, these first and second output terminals $\overline{Q}$ and Q are connected respectively to the base electrodes of a pair of NPN emitter follower clamping transistors 12 and 14 and to the emitters of the emitter follower signal output transistors 42 and 40. These latter transistors, and all others in the circuit, may be of the diffused junction type. The collectors of the transistors 12 and 14 are grounded, and the emitters are connected to respective emitter resistors 16 and 18. Thus, transistors 12 and 14 act as emitter followers.

The particular circuit shown in FIG. 1 responds to J and K input signals, expressed in their complemented form $\overline{J}$ and $\overline{K}$, and applied to the base electrodes of a pair of transistors 20 and 22. The circuit also responds to clock pulses, expressed by the complement form $\overline{C}_1$, these complemented clock pulses being applied to the base electrodes of a pair of transistors 24 and 26. The circuit may be operated without clocking, if desired, by supplying $\overline{J}$ inputs to transistors 22 and 26 and $\overline{K}$ inputs to transistors 20 and 24.

The collectors of the transistors 20, 22, 24 and 26 are grounded. The emitters of the transistors 20 and 24 are connected to a common emitter resistor 28, whereas the emitters of the transistors 22 and 26 are connected to a common emitter resistor 30. The resistors 28 and 30 are connected to the negative terminal of a source of potential $V_{EE}$. The transistors 22 and 26 are coupled through a first capacitor 32 to the emitter of the first emitter follower clamping transistor 14; and the emitters of the transistors 20 and 24 are coupled through a second capacitor 34 to the emitter of the second emitter follower clamping transistor 12.

Figure 2:
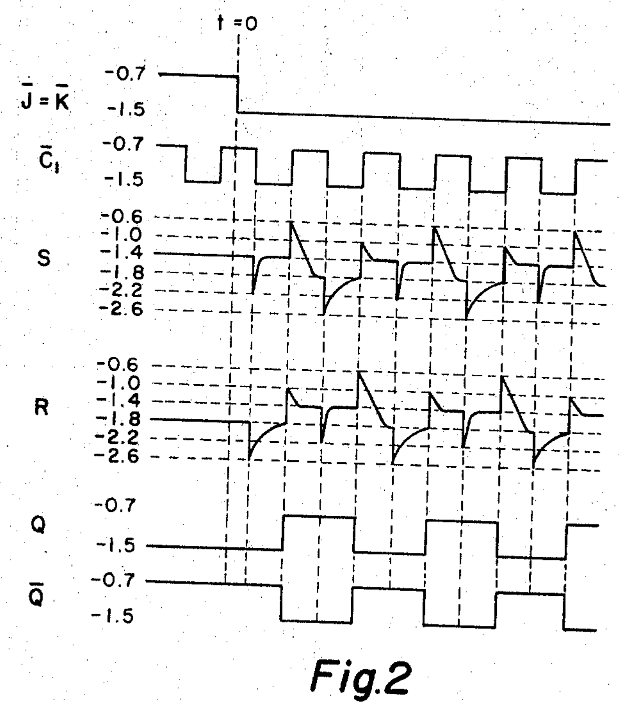
FIG. 2 is a series of waveforms useful in explaining the operation of the circuit of FIG. 1.

In the operation of the circuit of FIG. 1, the clock pulses $\overline{C}_1$ have a sufficient duration to cause capacitors 32 and 34 to become completely charged. Then, on the trailing edge of the corresponding clocking pulse, one of the capacitors discharges rapidly, providing a triggering signal for the set-reset flip-flop 10. Such a triggering signal is shown in FIG. 2 as a negative spike occurring in the set waveform (S) just after $T=0$. The other capacitor discharges more slowly and is at a lower voltage level, so it is over-ridden by the more rapidly discharging capacitor.

It will be assumed now that the flip-flop is in its reset state, such that the transistor 14 is conductive and the transistor 12 is non-conductive. It will also be assumed initially that the inputs to the $\overline{J}$, $\overline{K}$ and $\overline{C}_1$ terminals are all at the −0.7 volt level so that the transistors 20, 22, 24 and 26 are all conductive. Therefore, during the interim conditions, there is no charge developed across either the capacitors 32 or 34. The waveforms of FIG. 2 illustrate the operation of the circuit.

The negative clock pulse $\overline{C}_1$ which occurs just before $T=0$ does not alter the condition of the flip-flop 10 because the $\overline{J}$ and $\overline{K}$ inputs are not true; i.e., they are at −0.7 volt. At $T=0$, $\overline{J}$ and $\overline{K}$ swing negative to −1.5 volts, but the flip-flop does not change state because $\overline{C}_1$ is then at −0.7 volt. Shortly after $T=0$, $C_1$ goes from 0.7 to −1.5 volts. Since transistors 20, 22, 24 and 26 are emitter followers, the voltage at their emitters goes negative following the base voltage. The voltage at S was initially clamped at −1.4 volts by the emitter follower transistor 14 whose base is connected to output $\overline{Q}$ where −0.7 volt appears. Initially, the voltage drop across resistors 16 and 58 is such that the voltage at R is −1.8 volts.

When the emitters of transistors 20, 22, 24 and 26 go negative at $T=0$, the capacitors 32 and 34 are immediately charged negatively. The voltage at S drops to −2.2 volts and that at R drops to −2.6 volts. Then there is 1.5 volts from emitter-to-base of transistor 14 and 1.1 volts from emitter-to-base of transistor 12. Therefore, transistor 14 has lower impedance than transistor 12, so capacitor 32 is discharged to −1.4 volts by current through transistor 14 more quickly than capacitor 34 is discharged to −1.8 volts by current through transistor 12. The pulses produced by the charging and discharging of capacitors 32 and 34 at the leading edge of the clock pulse are of the wrong polarity to change the state of the flip-flop 10.

At the trailing edge of the first $\overline{C}_1$ pulse after $T=0$, the voltage at the emitters of transistors 24 and 26 goes positive, and capacitors 32 and 34 both become positively charged. The voltage at S rises immediately to −0.6 volt as that at R rises to −1.0 volt. Since the emitters of the latter transistors are both at the same potential (−1.8 volts), first pullover transistor 64 has more forward bias than second pullover transistor 70, transistor 64 draws all of the constant current which flows through resistor 58. Its collector goes negative and drives both the base and emitter of first emitter follower signal output transistor 40 negative such that the $\overline{Q}$ output changes from −0.7 volt to −1.5 volts. Thus, the positive spike appearing at S causes the flip-flop 10 to switch from the reset state to the set state. Naturally, the Q output changes from −1.5 volts to −0.7 volt.

Capacitor 32 then discharges until the voltage at S reaches −1.8 volts where it stays. Capacitor 34 discharges until the voltage at R reaches −1.4 volts where it is clamped by the second emitter follower clamping transistor 12 which has −0.7 volt on its base and −1.4 volts at its emitter. This completes one cycle of operation.

The leading edge of the next negative clock pulse $\overline{C}_1$ will not change the state of the flip-flop, but the trailing edge of that pulse produces a positive spike at R which changes the flip-flop to the reset state. Succeeding clock pulses will likewise switch the flip-flop so long as $\overline{J}$ and $\overline{K}$ are true; i.e., at −1.5 volts.

The mode of operation which has been described is the toggle mode. The circuit can also be operated in the J-K mode, as mentioned prevoiusly, by using the base of transistor 26 as a second $\overline{J}$ input and the base of transistor 24 as a second $\overline{K}$ input.

Therefore, the adapting circuitry outside the dashed enclosure 10 of FIG. 1 is capable of converting the set-reset flip-flop within enclosure 10 into a clocked trailing edge J-K flip-flop.

The circuit of the set-reset flip-flop 10 of FIG. 1 is the same as a circuit described in the copending application referred to previously. The latter flip-flop includes, for example, a plurality of NPN transistors 40, 42, 44, 46. The transistors 40 and 42 are connected as emitter followers, and have emitter follower resistors 48 and 50 connected to the negative terminal of the unidirectional voltage source $-V_{EE}$. This voltage may have a value, for example, of 5.2 volts. The resistors 48 and 50 may each have a resistance of 2000 ohms.

The output terminal Q of the flip-flop is connected to the emitter of the second emitter follower signal output transistor 42, whereas the reset output terminal $\overline{Q}$ is connected to the emitter of the first emitter follower signal output transistor 40.

As described in the aforesaid copending application, the transistors 52 and 54 function as holding transistors, and their bases are cross-coupled respectively to the emitters of transistors 42 and 40. The emitters of the holding transistors 52 and 54 are connected through a common resistance 56, 58 to the negative terminal of the source $-V_{EE}$. The resistor 56 may have a resistance of 130 ohms, and its value is approximately half that of resistors 60 and 62 which are connected between ground and the collectors of second and first holding transistors 52 and 54.

Transistors 64, 66, 68 and 70 serve as pull-over transistors and receive the set and reset inputs as noted in FIG. 1. Their emitters are connected to the junction or tap point between resistors 56 and 58 and the tap point is selected such that the threshold level of the flip-flop is one-half of a logic swing; i.e., midway bewteen the high and low levels of the output voltage appearing at terminals Q and $\overline{Q}$.

The operation of the flip-flop circuit is described in detail in the copending application. The circuit functions as a set-reset flip-flop, in that a change of state of the signal applied to the SET input terminal causes the flip-flop to change state, only if it is then in its reset state. Similarly, a change of state of the signal applied to the RESET input terminal causes the flip-flop to change state, only if the flip-flop is in its set state. As mentioned above, the flip-flop circuit 10 of itself is incapable of J-K operation. That is, should both the SET and RESET input terminals receive a logical "one" simultaneously, there is no change in the state of the flip-flop.

However, by the inclusion of the adapting circuitry as shown in FIG. 1, the flip-flop 10 may readily be converted to the J-K type of flip-flop, and one which has toggle capabilities, as described.

Figure 3:
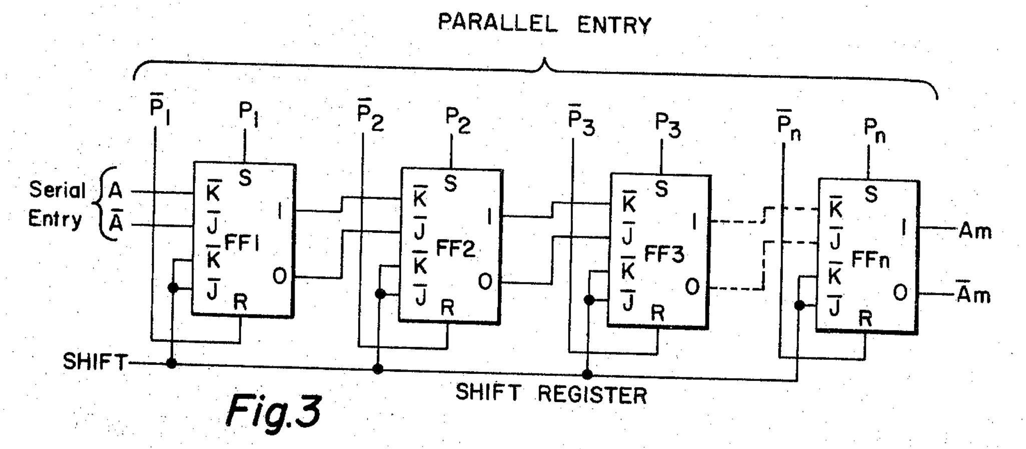
FIG. 3 is a schematic diagram of a shift register implemented with J-K flip-flops as shown in FIG. 1.
Figure 4:
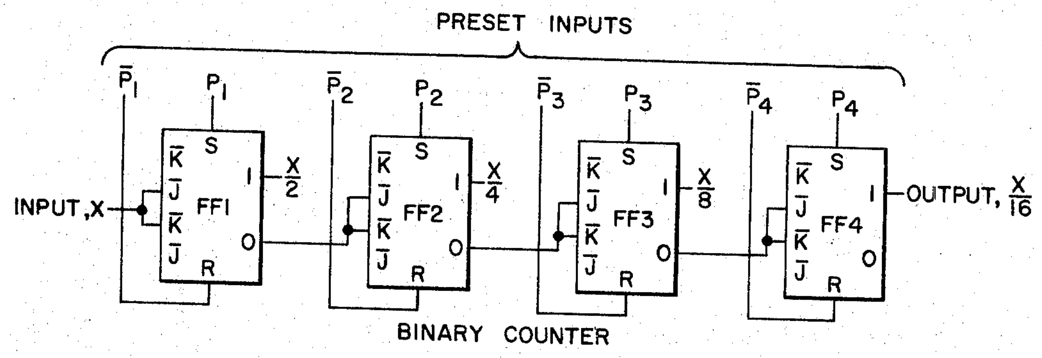
FIG. 4 shows a binary counter, likewise implemented with the flip-flops of FIG. 1.
Figure 5:
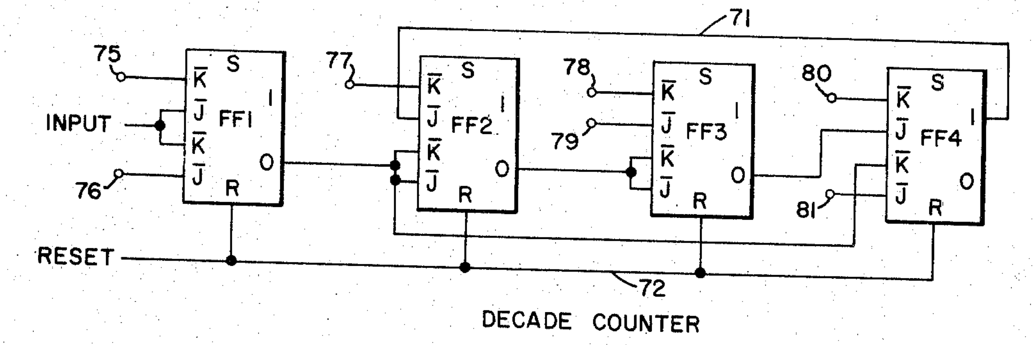
FIG. 5 is a decade counter implemented with the same flip-flops.

Typical applications of the circuit of FIG. 1 are shown schematically in FIGS. 3–5. FIG. 3 is a shift register, FIG. 4 is a binary counter, and FIG. 5 is a decade counter. In each case, it may be noted that no additional components are required. The flip-flops, designated FF1, FF2, etc., are simply interconnected in such a way as to provide the desired function. In particular, it should be noted that it only takes four J-K flip-flops to implement a decade counter (FIG. 5) and that it is not necessary to have external feedback circuitry to make the counter reset itself when a count of 10 is reached. Such resetting is accomplished simply by the interconnections 71 and 72. Decade counters built with J-K flip-flops known in the prior art require at least one gate circuit in addition to the flip-flops.

The circuit of FIG. 1 is particularly well-suited for integrated circuit construction. All the transistors are of the NPN type, and they may be formed of diffused junctions on a common substrate. Moreover, the transistors are emitter coupled, and involve the emitter coupled logic circuitry so that optimum use of the integrated circuit techniques may be used.

Each of the flip-flops, 1 through 4, of FIG. 5 are shown with two $\overline{J}$ and $\overline{K}$ inputs. Referring to FIG. 1 it can be seen that the C input to the base of transistor 26 represents a second $\overline{J}$ input while the $\overline{C}$ input to the base of transistor 24 represents a second K input. The $\overline{J}$ input transistors are coupled in parallel and the K input transistors are coupled in parallel with each pair forming a 2 input AND gate. Therefore, it is necessary that each input receive a signal in odrer that the J-K flip-flop operate properly. For example, when the signal applied to one of the $\overline{J}$ inputs is constant during the operation of the device, it is necessary that this $\overline{J}$ input signal bias the transistor to which it is applied to the off condition so that a changing signal applied to the other $\overline{J}$ input can operate the J-K flip-flop in a desired manner. If the constant input is such that the transistor to which it is coupled is biased continuously ON then the changing input will produce no change in the operation of the device. This also holds true for the $\overline{K}$ inputs. Thus, in FIG. 5 the $\overline{J}$ and $\overline{K}$ inputs to terminals 75–81, which are not used in the operation of the decade counter, are all coupled to a signal having a constant logic level so that the transistors to which they are coupled are biased to the off condition.

The invention provides, therefore, an improved and simplified circuit, whereby a set-reset flip-flop may be converted into a clocked J-K type, with toggle capabilities.

While a particular embodiment of the invention has been described, it is evident that modifications may be made. The following claims are intended to cover all modifications which fall within the scope of the invention.

What is claimed is:

1. A J-K flip-flop including, in combination: first and second emitter follower signal output transistors cross-coupled, respectively, to first and second holding transistors and providing a current path to said first and second holding transistors during the alternate conduction thereof, a first pullover transistor DC coupled in parallel with said first holding transistor and adapted to receive an override signal to thereby override said first holding transistors and initiate a change in the conductive state of said flip-flop, a second pullover transistor DC coupled in parallel with said second holding transistor and adapted to receive an override signal and thereby override said second holding transistor and initiate a change in the conductive state of said flip-flop, and means for receiving AC coupled voltage transitions at the inputs of said first and second pullover transistors for alternately driving the voltages at the inputs of said first and second pullover transistors to levels sufficiently high to drive said first and second pullover transistors into conduction and provide a toggling of said flip-flop.

2. The flip-flop as defined in claim 1 wherein said means for receiving AC coupled voltage transitions at the inputs of said first and second pullover transistors include, respectively, first and second capacitors connected to said first and second pullover transistors and further connected to first and second emitter-coupled AND gates, respectively; each of said AND gates having first and second input terminals for receiving binary logic signals operative to couple AC voltage transitions through said first and second capacitors to alternately drive said first and second pullover transistors into conduction.

3. The J-K flip-flop as defined in claim 2 which further includes set and reset input transitsors DC coupled in parallel with said first and second pullover transistors and having set and reset input terminals, said set and reset input terminals connectable to either constant voltage inputs or asynchronous control signals for imparting to said flip-flop a DC set and reset capability and an asynchronous control capability.

4. A J-K flip-flop having a clocked capability and having first and second conductive states; said flip-flop including in combination: first and second signal output transistors and first and second holding transistors, said first and second signal output transistors having first and second output terminals connected thereto, means cross-coupling said first and second signal output transistors to said first and second holding transistors, respectively, and providing a current path through said flip-flop during the alternate conduction of said first and second holding transistors in the first and second conductive states of the flip-flop, first and second pullover transistors DC coupled in parallel with said first and second holding transistors, respectively, and further connected to receive an override signal at the input thereof for changing the conductive state of the flip-flop, a first emitter follower clamping transistor connected between said first output terminal and said first pullover transistor for establishing a first DC voltage level at said first pullover transistor when said flip-flop is in one of its two conductive states, a second emitter follower transistor connected between said second output terminal and said second pullover transistor for establishing a second DC voltage level at said second pullover transistor when said flip-flop is in said one of its two conductive states, a first capacitor connected to said first pullover transistor and further coupled to a source of logic transitions which may be capacitively coupled through said first capacitor to drive said first pullover transistor into conduction, a second capacitor connected to said second pullover transistor and further coupled to a source of logic transitions which may be capacitively coupled through said second capacitor to drive said second pullover transistor alternately into conduction with said first pullover transistor, whereby said flip-flop may be clocked by logic signals coupled to said first and second capacitors to cause said J-K flip-flop to toggle at high frequencies.

5. A J-K flip-flop connectable as a monolithic integrated circuit and including, in combination: first and second emitter follower signal output transistors cross-coupled, respectively, to first and second holding transistors, and providing a current path to said first and second holding transistors during the alternate conduction thereof, a first pullover transistor DC coupled in parallel with said first holding transistor and also connected to a bias circuit within said flip-flop, said first pullover transistor operative to override said first holding transistor when voltage transitions applied to said first pullover transistor reach a predetermined level; a second pullover transistor DC coupled in parallel with said second holding transistor and also connected to said bias circuit within said flip-flop, said second pullover transistor operative to conduct alternately with said first pullover transistor and override said second holding transistor, thereby changing the conductive state of said flip-flop, first and second output terminals connected, respectively, to said first and second emitter follower signal output transistors, a first emitter follower clamping transistor connected between said first output terminal and said first pullover transistor, a second emitter follower clamping transistor connected between said second output terminal and said second pullover transistor, said first and second clamping transistors establishing first and second DC voltage levels at said first and second pullover transistors, respectively, a first capacitance means connected to said first pullover transistor, a second capacitance means connected to said second pullover transistor, first and second input logic circuits connected, respectively, to said first and second capacitance means for AC coupling voltage transitions to the inputs of said first and second pullover transistors, respectively, for toggling said J-K flip-flop.

6. A J-K flip-flop according to claim 5 wherein said bias circuit comprises a resistive bias network connected between a voltage supply terminal and a common output point of said first and second holding transistors, said resistive bias network having an intermediate tap thereon connected to the outputs of said first and second pullover transistors for establishing a DC bias level at said first and second pullover transistors with respect to the DC bias level at said first and second holding transistors.

7. A monolithic integrated J-K flip-flop having two stable conductive states and operative to be switched from one to the other of its two stable states at high frequency J-K clocked operation, said flip-flop including, in combination: first and second emitter follower signal output transistors cross-coupled, respectively, to first and second holding transistors in a bistable circuit configuration wherein the first and the second holding transistors alternately conduct as the flip-flop is switched from one to the other of its two conductive states, said first and second emitter follower signal output transistors providing current paths to said first and second holding transistors during the alternate conduction of said first and second holding transistors, first and second output terminals connected, respectively, to said first and second emitter follower signal output transistors, first and second pullover transistors DC coupled in parallel with said first and second holding transistors and adapted to receive override signals for alternately driving said pullover transistors into conduction and alternately overriding said first and second holding transistors, thereby alternately changing the conductive state of the flip-flop, first and second input capacitors connected, respectively, to said first and second pullover transistors, and first and second input logic circuit means connected to said first and second capacitors, respectively, for coupling an override signal to said first and second pullover transistors and changing the conductive state of the flip-flop.

8. Logic circuitry as defined in claim 7 and further including, in addition to the first flip-flop of claim 7, second, third, and fourth flip-flops, each of said flip-flops having DC set and reset transistors DC coupled in parallel with said first and second holding transistors and with said first and second pullover transistors in each flip-flop; each of said DC set and reset transistors having set and reset input terminals, respectively, said first and second input logic circuit means of each flip-flop including first and second AND gates, respectively; each of said AND gates having a $\overline{J}$ input terminal and a $\overline{K}$ input terminal, said flip-flops connectable as a decade counter which includes, in combination: circuit means connected to each of said reset terminals of said J-K flip-flops for applying a constant DC reset signal thereto, means for applying $\overline{J}$ and $\overline{K}$ input information to said first and second AND gates of said first flip-flop, means connecting said first output terminal of said first flip-flop to said second AND gate of said second flip-flop and to said second AND gate of said fourth flip-flop, means connecting said first output terminal of said second flip-flop to said second AND gate of said third flip-flop, means connecting said first output terminal of said third flip-flop to said first AND gate of said fourth flip-flop, and feedback means connecting said second output terminal of said fourth flip-flop to said first AND gate of said second flip-flop, whereby said fourth flip-flop changes conductive states once after ten input pulses have been sequentially applied to said first flip-flop.

9. A monolithic integrated J-K flip-flop having two stable conductive states and operative to be switched from one to the other of its two conductive states at high frequency J-K clocked operation, said flip-flop including, in combination: first and second signal output transistors cross-coupled, respectively, to first and second holding transistors in a bistable circuit configuration wherein the first and the second holding transistors alternately conduct as the flip-flop is switched from one to the other of its two conductive states, first and second output terminals connected, respectively, to said first and second output transistors, first and second pullover transistors DC coupled in parallel with said first and second holding transistors and adapted to receive an override signal and thereby alternately override said first and second holding transistors, changing the conductive state of the flip-flop, a first clamping transistor connected between said first output terminal and said first pullover transistor for establishing a first DC level at said first pullover transistor, when said flip-flop is in one of its two conductive states, a second clamping transistor connected between said second output terminal and said second pullover transistor for establishing a second DC level at said second pullover transistor when said flip-flip is in said one conductive state, first and second capacitors connected, respectively, to said first and second pullover transistors and connected to emitter-coupled input logic circuitry, said first and second capacitors receiving input voltage transitions when logic signals applied to the emitter coupled input logic circuitry reach predetermined logical levels, said first and second capacitors coupling said voltage transitions to the inputs of said first and second pullover transistors for driving the voltages thereat to levels sufficient to turn on one or the other of said first and second pullover transistors and thereby override one or the other of said first and second holding transistors, respectively, and change the conductive state of said flip-flop.

References Cited

UNITED STATES PATENTS

| | | | |
|---|---|---|---|
| 2,869,000 | 1/1959 | Bruce | 307—88.5 |
| 3,008,055 | 11/1961 | Crosby et al. | 307—88.5 |
| 3,029,352 | 4/1962 | Marshall | 307—88.5 |
| 3,058,007 | 10/1962 | Lynch | 307—88.5 |
| 3,259,757 | 7/1966 | Lavin | 307—88.5 |

FOREIGN PATENTS 1,146,537 4/1963 Germany.

ARTHUR GAUSS, *Primary Examiner.*

R. H. EPSTEIN, *Assistant Examiner.*